Sept. 22, 1931.  F. J. HAGERLING  1,824,133
TOOL
Filed July 23, 1928
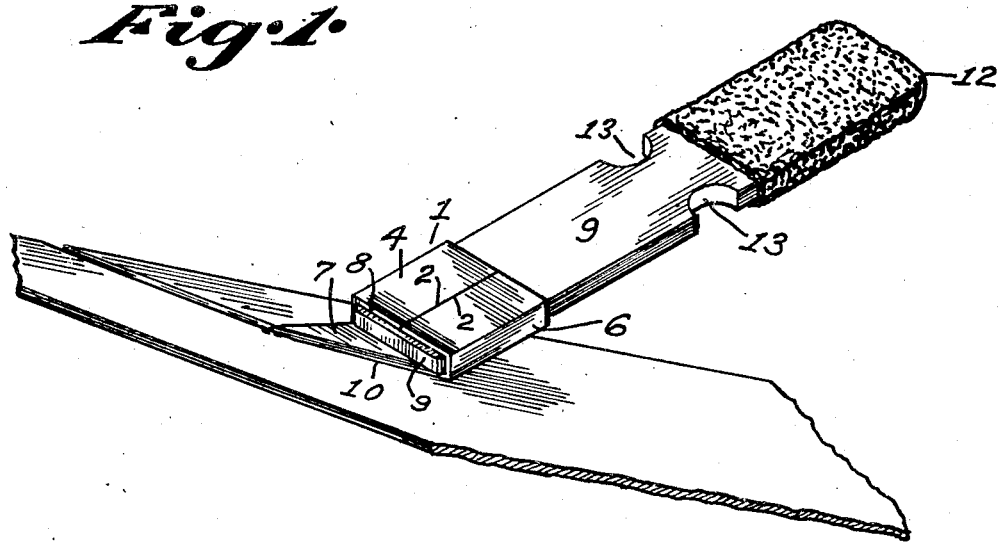
Fig·1·
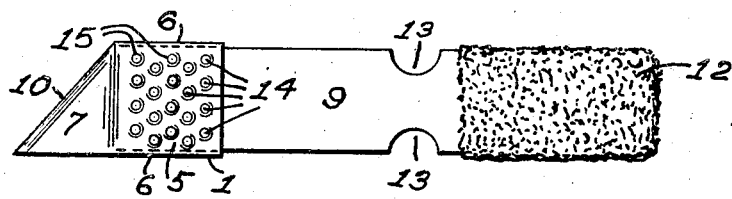
Fig·2·
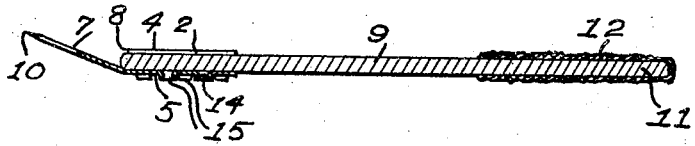
Fig·3·
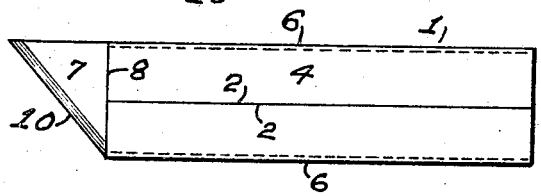
Fig·5·
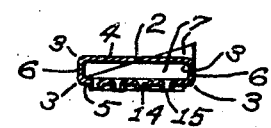
Fig·4·
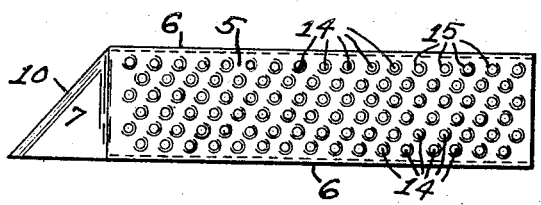
Fig·6·
Fig·7·
Inventor;
Fred J. Hagerling,
By Hugh K. Wagner
Attorney.

Patented Sept. 22, 1931

1,824,133

UNITED STATES PATENT OFFICE

FRED J. HAGERLING, OF ST. LOUIS, MISSOURI

TOOL

Application filed July 23, 1928. Serial No. 294,903.

This invention relates to a tool for trimming soft material, and is particularly useful in cutting rubber tire and tube patches from sheet material and in buffing or abrading the portion of a tube to which it is to be applied, although certain features of the invention are applicable individually to other uses.

The principal purpose of the invention is to provide a tool of the character described which is of simple and substantial construction, which may be produced at a comparatively low cost and of a minimum amount of material, and which is highly efficient and convenient in use. Other objects and desirable features of the invention will appear in the course of the following description of an illustrative embodiment of the invention.

In the accompanying drawings forming part of this specification, in which like numbers of reference denote like parts wherever they occur.

Figure 1 is a perspective view of one form of a tool made in accordance with this invention;

Figure 2 is a view of the bottom side of the same;

Figure 3 is a longitudinal vertical central sectional view of the same;

Figure 4 is a transverse sectional view of the same as it appears without the handle, looking toward the cutting blade;

Figures 5 and 6 are a plan and a bottom view, respectively, of a modification; and Figure 7 is a lateral edge view of still another form of the invention.

A trimming sleeve 1 is formed by bending the opposing edges 2 of a metal sheet, preferably steel, towards one another, there being preferably two consecutive right angle bends 3 employed in turning each edge, so that the sleeve is substantially oblong in cross-section, with the opposing edges 2 in abutting relation to one another, and having a rear side 4, front side 5, and narrow or edge sides 6, with the edges 2 on the rear side 4. A blade portion 7 of the sheet projects from the anterior end 8 of the sleeve on the front side 5, the said blade 7 extending forwardly and obliquely across the opening at said end. A handle or body 9, shown in Figures 1 to 4, inclusive, preferably of wood, and oblong in cross section so as to fit frictionally in the sheath or sleeve 1, is limited in its forward movement through the sleeve by abutment against the flange or blade 7. This functioning of the blade 7 as a stop for the handle 9 is especially desirable, for the reason that, when the tool is in use, the pressure on the handle is exerted toward the blade 7, and tends to force the handle through the sleeve, although the friction between the handle and the sleeve is sufficient to prevent the handle from slipping out of the sleeve in the opposite direction. The blade is disposed obliquely with respect to the axis of the sleeve for the further reason also that it assumes the proper operative position when the handle is held in its most convenient position for cutting a beveled edge. For the same reason, the front or cutting edge 10 of the blade is disposed obliquely, instead of at a right angle to the axis of the sleeve. The handle 9 has its free end 11 preferably covered with a deposit of abrasive material 12, such as carborundum, so that it may be used as a buffer or burnisher if desired, to smooth the portion of the tube to which the patch is to be applied. Notches or recesses 13 are formed in the handle 9 to fit the fingers of the user so that it may be conveniently and securely held, especially when the end 11 is used as a burnisher.

The abrasive material 12, however, cannot be used very effectively on a wet surface, so that the front side 5 of the sleeve has been provided with a plurality of perforations 14, having outwardly bent edges 15, that may be scraped over the surface to be smoothed in grater-like fashion.

If desired, the handle 9 may be dispensed with, and the sleeve 1 lengthened sufficiently to serve as a handle, the outwardly dented perforations 14 preferably extending along the full length of the elongated front face 5 of the sleeve, thereby expediting the buffing or smoothing, especially where the surface to be smoothed is extensive. Figures 5 and 6 illustrate a form of the invention having an elongated sleeve of this character.

If, instead of cutting the patch with a beveled edge, it is preferable to cut it through at right angles to the plane of the sheet of the patch, the form of the invention shown in Figure 7 may be employed, in which the blade extends from the sleeve in parallel relation thereto, instead of obliquely.

Having thus fully described this invention, I hereby reserve the benefit of all changes in form, arrangement, order, of use of parts, as it is evident that many minor changes may be made therein without departing from the spirit of this invention or the scope of the following claims.

I claim:

1. A cutter including a sleeve, a blade projecting forwardly from the anterior end of said sleeve and angularly with respect to the front side thereof, said blade presenting a cutting edge disposed obliquely across the entire opening at said end and a handle inserted into said sleeve with its anterior end in abutting relation to the oblique portion of said blade adjacent said sleeve, whereby said handle is prevented from slipping forwardly in said sleeve.

2. A cutter comprising a sleeve adapted to be associated with a handle, a blade formed integrally therewith and projecting from one end of said sleeve, said blade presenting a cutting edge disposed obliquely to the axis of the sleeve, one end of said cutting edge being positioned adjacent one side of said sleeve, the other end terminating within the plane of the other side of said sleeve, said blade being bent upwardly across the front opening of said sleeve to engage the end of a handle inserted in said sleeve and to limit the forward travel of the handle when pressure is applied thereto.

3. A cutter formed from a single piece of material having a pair of opposing edges bent towards one another into sleeve formation, a blade formed integrally therewith and projecting from one end of said sleeve, said blade presenting a cutting edge disposed obliquely to the axis of the sleeve, one end of said cutting edge being positioned adjacent one side of said sleeve, the other end terminating within the plane of the other side of said sleeve, said blade being bent upwardly across the front opening of said sleeve to engage the end of a handle inserted in said sleeve and to limit the forward travel of the handle when pressure is applied thereto.

In testimony whereof I hereunto affix my signature.

FRED J. HAGERLING.